United States Patent [19]

Hine

[11] Patent Number: 5,304,387
[45] Date of Patent: Apr. 19, 1994

[54] METHOD OF MAKING A HIGH MOISTURE NON-FAT CHEESE SAUCE

[75] Inventor: William S. Hine, Evanston, Ill.

[73] Assignee: Kraft General Foods, Inc., Northfield, Ill.

[21] Appl. No.: 891,732

[22] Filed: Jun. 1, 1992

[51] Int. Cl.⁵ .............................................. A23C 19/09
[52] U.S. Cl. .................... 426/582; 426/573; 426/578
[58] Field of Search ......................... 426/582, 578, 573

[56] References Cited

U.S. PATENT DOCUMENTS

| | | | |
|---|---|---|---|
| 3,017,274 | 1/1962 | Dahlstrom | 99/116 |
| 3,156,568 | 11/1964 | Hargrove et al. | 99/116 |
| 4,476,143 | 10/1984 | Czulak et al. | 426/40 |
| 4,568,555 | 2/1986 | Spanier | 426/582 |
| 4,689,234 | 8/1987 | Ernstrom et al. | 426/38 |
| 4,719,113 | 1/1988 | Kharrazi | 426/35 |
| 4,820,530 | 4/1989 | Moran et al. | 426/40 |
| 4,859,484 | 8/1989 | Bielskis et al. | 426/573 |
| 4,861,610 | 8/1989 | Kato et al. | 426/582 |
| 5,037,659 | 8/1991 | Trecker et al. | 426/40 |
| 5,061,504 | 10/1991 | Kong-Chan et al. | 426/582 |

OTHER PUBLICATIONS

"Phosphates Improve Many Foods", Food Technology, pp. 80–92 (Apr., 1990).

*Primary Examiner*—Helen F. Pratt
*Attorney, Agent, or Firm*—Fitch, Even, Tabin & Flannery

[57] ABSTRACT

The present invention is directed to a method for producing a high moisture, non-fat cheese sauce. In accordance with the method, a skim milk cheese having from about 40% to about 60% moisture and a milk protein source having from about 3% to about 70% moisture are heated to an elevated temperature of from about 160° F. to about 190° F. with agitation so as to form a homogeneous mixture of the skim milk cheese and the milk protein source. The agitation at the elevated temperature is continued while a polyphosphate complexing salt, starch and a gum are added to the heated mixture. The agitation at the elevated temperature is continued for a period of time sufficient to gelatinize the starch and permit the polyphosphate complexing salt to interact with the casein of the skim milk cheese and the milk protein source and to form a stable, high moisture, non-fat cheese sauce. The cheese sauce is then packaged while the temperature of the cheese sauce is above about 100° F.

11 Claims, No Drawings

METHOD OF MAKING A HIGH MOISTURE NON-FAT CHEESE SAUCE

FIELD OF THE INVENTION

The present invention is directed to a high moisture non-fat cheese sauce and to a method for manufacture thereof. More particularly, the invention is directed to a high moisture cheese sauce which is prepared from dairy ingredients stabilized with a polyphosphate salt complexing agent, starch and a gum to provide a high moisture, non-fat cheese sauce which can be made shelf-stable without refrigeration.

BACKGROUND OF THE INVENTION

Processed cheese products containing a substantial level of fat are well known in the food industry and Standards of Identity have been established by the United States Food and Drug Administration for several types of processed cheese products.

In accordance with the Standards of Identity, pasteurized processed cheese is the food prepared by comminuting and mixing, with the aid of heat, one or more natural cheeses of the same or two or more varieties. Specifically excluded from use in the preparation of pasteurized processed cheese, however, are cream cheese, neufchatel cheese, cottage cheese, low fat cottage cheese, cottage cheese dry curd, cooked cheese, hard grating cheese, semisoft part-skim cheese, part-skim spice cheese and skim milk cheese. The pasteurized processed cheese is prepared by heating the natural cheese with an emulsifying agent while mixing into a homogeneous plastic mass. During its preparation, pasteurized processed cheese is heated for not less than 30 seconds at a temperature of not less than 150° F. The moisture content of pasteurized processed cheese cannot be more than 43%, except that the moisture content of pasteurized process washed curd cheese or pasteurized process colby cheese cannot be more than 40%. The moisture content of pasteurized process Swiss cheese or pasteurized process Gruyere cheese is not more than 44%. The moisture content of pasteurized process Limburger cheese is not more than 51%.

The fat content (dry basis) of pasteurized processed cheese cannot be less than 47% except that the fat content of pasteurized process Swiss cheese is not less than 43% and the fat content of pasteurized process Gruyere cheese is not less than 45%.

The emulsifying agents prescribed for use in the manufacture of pasteurized process cheese are one or any mixture of two or more of the following: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate.

Pasteurized process cheese food is prepared in a manner similar to that of pasteurized processed cheese except that the moisture content is not more than 44% and the fat content is not less than 23%. For pasteurized processed cheese food, addition of cream, milk, skim milk, buttermilk, cheese whey and any of the foregoing from which part of the water has been removed can be used. Anhydrous milkfat, dehydrated cream, albumin from cheese whey and skim milk cheese can also be used in pasteurized processed cheese food. The same emulsifying agents permitted in the manufacture of pasteurized processed cheese can also be used in the manufacture of pasteurized processed cheese food.

Pasteurized process cheese spread is prepared in a manner similar to pasteurized processed cheese and pasteurized processed cheese food. The moisture content of a pasteurized processed cheese spread is more than 44%, but not more than 60%, and the fat content is not less than 20%. The same emulsifying agents can be used. In addition, the use of gums is permitted in the manufacture of pasteurized processed cheese spread. The gums can be selected from the group consisting of carob bean gum, gum karaya, gum tragacanth, guar gum, gelatin, sodium carboxymethyl cellulose, carrageenan, oat gum, sodium alginate, propylene glycol alginate and xanthan gum. The total weight of the gums cannot be more than 0.8% of the weight of the finished pasteurized processed cheese spread.

The above described processed cheese products have a body and texture such that they are either sliceable or spreadable. It would be desirable to provide a high moisture, non-fat cheese sauce which has a lower viscosity than the heretofore known processed cheese products and which is shelf-stable with aseptic packaging. With increasing consumer awareness, the focal point of the food industry is on reducing fat and calorie consumption. Low-fat, low calorie foods, which look and taste similar to their full fat, higher calorie counterparts, are eagerly sought by the consumer. Researchers in the food industry have concentrated on developing food products which are nutritious and palatable and which contain substantially reduced levels of fat containing ingredients. This is particularly true in the dairy industry, where low calorie, low-fat products, such as skim milk, yogurt and reduced fat ice cream have been successfully marketed. The high fat levels associated with processed cheese products have been thought to be necessary to maintain a desirable creamy mouthfeel associated with pasteurized processed cheese products. The combination of high total solids, contributed in part by the high fat content, and the relatively low pH have been necessary to provide shelf stability in shelf-stable, pasteurized process cheese products.

U.S. Pat. No. 4,689,239 to Rispoli et al., for example, is directed to a process for producing an aseptically processed, natural, dairy-based sauce. In accordance with the process of the Rispoli, et al. patent, a combination of 40 to 80% by weight of whole milk or an equivalent amount of non-fat dry milk and water, 0 to 25% by weight of heavy cream, 1 to 15% by weight of butter, 2 to 20% by weight of corn starch which has a majority of amylopectin, 1 to 8% of high amylose corn starch comprising greater than 50% amylose and 0 to 40% by weight of flavors and particulates is heated to a temperature of from 140° F. to 190° F. for from 10 minutes to about 30 minutes. The heated blend is homogenized and the homogenized blend is again heated to a temperature exceeding 250° F. for from about 10 seconds to about 120 seconds. This blend is then cooled and held for a period of time sufficient to increase the blend viscosity to 3,000 to 30,000 centipoise. The Rispoli, et al. patent does not utilize any cheese components and any cheese flavor associated with the dairy-based sauce of the Rispoli, et al. patent must be imparted by use of added flavors.

It is a principal object of the present invention to provide a method for producing a high moisture, non-fat cheese sauce from skim milk cheese.

It is another object of the present invention to provide a method for producing a high moisture, non-fat cheese sauce from skim milk cheese which is shelf-stable and which has a dippable consistency suitable for multiple product applications, such as dips, spreads, sauces and as an ingredient in frozen entrees and side dishes.

SUMMARY OF THE INVENTION

The present invention is directed to a method for producing a high moisture, non-fat cheese sauce. In accordance with the method, a skim milk cheese having from about 40% to about 60% moisture and a milk protein source having from about 3% to about 70% moisture are heated to an elevated temperature of from about 160° F. to about 190° F. with agitation so as to form a homogeneous mixture of the skim milk cheese and the milk protein source. The agitation at the elevated temperature is continued while a polyphosphate complexing salt, starch and a gum are added to the heated mixture. The agitation at the elevated temperature is continued for a period of time sufficient to gelatinize the starch and permit the polyphosphate complexing salt to interact with the casein of the skim milk cheese and the milk protein source and to form a stable, high moisture, nonfat cheese sauce. The cheese sauce is then packaged while the temperature of the cheese sauce is above about 100° F. All percentages used herein are by weight and all temperatures are degrees Fahrenheit, unless otherwise indicated.

The present invention relates generally to a non-fat cheese sauce having from about 70% to about 90% moisture. The non-fat cheese sauce is made from skim milk cheese and a milk protein source.

DETAILED DESCRIPTION OF THE INVENTION

In accordance with one process for the manufacture of the skim milk cheese used in the process of the present invention, the skim milk cheese is prepared from a skim milk source which can be selected from skim milk, a skim milk retentate produced by ultrafiltration of skim milk, concentrated skim milk, reconstituted non-fat dry milk or a mixture of any two or more of these with water in a quantity not in excess of that sufficient to reconstitute any concentrated skim milk or non-fat dry milk used to the level of moisture found in whole milk which has had the milkfat separated therefrom, i.e., about 91% moisture. The skim milk source, which may be pasteurized, and which may be warmed is subjected to the action of tactic acid producing bacteria which are either present in the milk or are added thereto. Sufficient rennet or other suitable milk-clotting enzyme is added to the skim milk to set the skim milk to a semisolid mass. Calcium chloride may also be added in a quantity of not more than 0.02%.

The mass is cut, stirred and heated with continued stirring so as to promote the separation of whey and curd. The whey is drained off and the curd is matted into a cohesive mass. Proteins from the whey may be incorporated into the cheese mass. The mass is cut into slabs which are piled and handled so as to further promote the drainage of whey and the development of acidity. The slabs are then cut into pieces, which may be rinsed by pouring or sprinkling water over them, with free and continuous drainage. The duration of the rinsing is limited so that only the whey on the surface of the curd pieces is removed. The curd is salted, stirred, further drained and pressed into forms. Certain animal or plant enzymes, which are capable of aiding in the curing or development of flavor of the skim milk cheese, may be added during the procedure.

U.S. Pat. No. 4,476,143 to Czulak, et al., U.S. Pat. No. 3,156,568 to Hargrove, et al. and U.S. Pat. No. 5,037,659 to Trecker, et al. describe processes for the manufacture of cheese from skim milk. In this connection, the term "skim milk cheese" as used herein is meant a natural cheese prepared from skim milk which has developed some flavor through ripening and which has from about 40% to about 60% moisture.

The milk protein source useful in the present invention is selected from the group consisting of bakers cheese, dry curd cottage cheese, non-fat dry milk solids, evaporated skim milk and skim milk retentate prepared by membrane treatment of skim milk. The milk protein source should have from about 3% to about 70% of moisture. Dry curd cottage cheese is a well known dairy product, which is a drained, uncreamed skim milk cheese curd made by inoculating skim milk with a lactic culture and allowing the product to coagulate. Dry curd cottage cheese may also be made by a direct acidification method. Generally, dry curd cottage cheese comprises about 20% to 25% by weight of non-fat milk solids and 75% to 80% by weight of water. When used herein, the term "dry curd cottage cheese" refers to a soft cheese curd, such as cottage cheese or bakers cheese curd product having the above solids and moisture characteristics. Concentrated skim milk produced by ultrafiltration, evaporation or by reconstitution of dried skim milk may also be used.

The skim milk cheese and the milk protein source are combined in a suitable apparatus for heating the skim milk cheese and the milk protein source. Prior to being heated, the skim milk cheese is preferably comminuted to provide particles of skim milk cheese having a size of from about 1/16 inch to about ⅜ inch. The skim milk cheese is used at a level of from about 10% to about 30% and the milk protein source is used at a level of from about 3% to about 9% on a dry solids basis. All percentages used herein are by weight of the finished cheese sauce product, unless otherwise specified. The combination of skim milk cheese and milk protein source are heated to a temperature of from about 160° F. to about 190° F. while the mixture is being agitated. Preferably, the heating is effected in a conventional process cheese laydown cooker wherein heating is effected by steam injection. Heating can also be effected in a jacketed mixer, such as Groen kettle. Heating to a temperature of 160° F. in the laydown cooker requires a time of from about 1 to about 3 minutes. After a temperature of 160° F. is attained, the mixture of skim milk cheese and the milk protein source has a smooth homogeneous appearance. Continuous cooking systems can also be used.

While continuing the agitation at the elevated temperature in the mixing apparatus, a polyphosphate complexing salt, starch and a gum are added to the heated mixture of skim milk cheese and the milk protein source.

As used herein, the term "polyphosphate complexing salt" refers to sodium and potassium phosphate salts which have at least two sodium or potassium molecules. Suitable polyphosphate complexing salts include pyrophosphates, tripolyphosphates, long chain polyphosphates having from 4 to 13 phosphate moieties, such as sodium hexametaphosphate, glassy phosphates and Graham's salt, and cyclic phosphates, such as sodium trimetaphosphate and sodium tetrametaphosphate. While not wishing to be bound by any theory, it is believed that the polyphosphate complexing salt interacts with the casein micelles contained in the skim milk cheese and the milk protein source to bind the casein into a loose network. It has been determined that other phosphate salts, such as orthophosphate having one phosphate moiety, and other known emulsifying salts, such as sodium citrate, used in the manufacture of processed cheese products, are not suitable for use in the method of the present invention. The use of such other phosphate salts and emulsifying salts results in a product which separates upon extended shelf storage. It should be noted that the polyphosphate complexing salt is not used as an emulsifying agent in the sense used in the manufacture of processed cheese products. There is no substantial amount of fat in the cheese sauce product of the present invention and thus no substantial emulsification of fat occurs through use of the polyphosphate complexing salt. The polyphosphate complexing salt is used at a level of from about 0.7% to about 3.0%.

The starch may be any of the natural, unmodified food grade starches, such as corn starch, tapioca starch, potato starch and rice starch. The starch may be pregelatinized in accordance with known techniques or may be ungelatinized. A preferred starch for use in the present invention is ungelatinized tapioca starch. The starch is used at a level of from about 1% to about 5%.

The gum may be any of the well known hydrocolloid gums used in the manufacture of processed cheese products and other food products. The gum may be selected from the group consisting of gum karaya, gum tragacanth, carob bean gum, gelatin, sodium alginate, propylene glycol alginate, guar gum, sodium carboxymethyl cellulose, carrageenan, microcrystalline cellulose and xanthan gum. A preferred gum is selected from the group consisting of microcrystalline cellulose and xanthan gum and mixtures thereof. The gum is used in the cheese sauce product of the present invention at a level of from about 0.02% to about 2.0%.

After the polyphosphate complexing salt, the starch and the gum is added to the heated mixture of the skim milk cheese and milk protein source, heating and agitation are continued at the elevated temperature for a period of time sufficient to gelatinize the starch and permit the polyphosphate complexing salt to interact with the casein of the cheese and the milk protein source and form a stable, high moisture, non-fat cheese sauce. The cheese sauce may then be subjected to aseptic heat treatment conditions to provide a shelf stable cheese sauce. Suitable aseptic heat treatment conditions consist of rapid heating to a temperature of about 270°–275° F. and a hold time at that temperature for a period of about 22–28 seconds. The cheese sauce is packaged, while still at an elevated temperature above about 100° F. The high moisture, non-fat cheese sauce product of the present invention, having a moisture content of from about 70% to about 90%, is shelf-stable after aseptic treatment without appreciable separation for a period of at least about 180 days at ambient temperature. The cheese sauce may be stored under refrigeration conditions without aseptic treatment for at least about 180 days. The cheese sauce product has a consistency which is spoonable and which can be used directly from the package as a cheese dip or for application to snack products, such as cheese topped nachos.

The following examples further illustrate various features of the present invention, but are intended to in no way limit the scope of the invention as set forth in the appended claims.

EXAMPLE 1

A forty pound batch of high moisture, non-fat cheese sauce was prepared using a skim milk cheese having 50% solids. 11.8 pounds of skim milk cheese was comminuted in a curd mill and placed into a laydown cooker. 3.05 pounds of non-fat dry milk having 5% moisture and 19.58 pounds of water were also added to the laydown cooker. Agitation was commenced and heating was started by injecting steam into the mixture of the skim milk cheese and the non-fat dry milk. Heating and agitation was continued until a temperature of 160° F. was attained. After this temperature was reached, the steam was turned off and 0.5 pounds of sodium hexametaphosphate, 1.28 pounds of tapioca starch and 0.042 pounds of xanthan gum were added to the homogeneous mixture of skim milk cheese and non-fat dry milk. Steam injection was then used to heat the mixture to 190° F. under agitation conditions and agitation at the elevated temperature was continued for an additional 2 minutes to gelatinize the starch and permit interaction of the hexametaphosphate with the casein of the skim milk cheese and the non-fat dry milk. The homogeneous blend of ingredients was then aseptically processed at 275° F. for 23 seconds and packaged into aseptic jars while at a temperature of 100° F. The steam added 3.8 pounds of water and the final moisture content of the cheese sauce was 80%. The cheese sauce product was placed into storage at a temperature of 72° F. and was periodically examined. The cheese sauce was still stable in terms of taste and texture after a period of 25 weeks.

EXAMPLE 2

A five pound batch of high moisture, non-fat cheese sauce was prepared using a skim milk cheese having 50% solids. 0.75 pounds of the skim milk cheese was comminuted in a curd mill and placed into a laydown cooker. 1.05 pounds of baker's cheese having 25% moisture and 2.06 pounds of water were also added to the laydown cooker. Agitation was commenced and heating was started by injecting steam into the mixture of the skim milk cheese and the baker's cheese. Heating and agitation was continued until a temperature of 160° F. was attained. After this temperature was reached, the steam was turned off and 0.075 pounds of sodium hexametaphosphate, 0.10 pounds of tapioca starch and 0.005 pounds of xanthan gum were added to the homogeneous mixture of skim milk cheese and non-fat dry milk. Steam injection was then used to heat the mixture to 190° F. under agitation conditions and agitation at the elevated temperature was continued for an additional 2 minutes to gelatinize the starch and permit interaction of the hexametaphosphate with the casein of the skim milk cheese and the non-fat dry milk. The homogeneous blend of ingredients was then packaged into clear jars while at a temperature of 185° F. The steam added 0.47 pounds of water and the final moisture content of the cheese sauce was 80%. The cheese sauce product was placed into refrigerated storage at a temperature of 45° F. and was periodically examined. The cheese sauce was still stable in terms of taste and texture after a period of 20 weeks.

EXAMPLE 3

A five pound batch of high moisture, non-fat cheese sauce was prepared using a skim milk cheese having 50% solids. 0.75 pounds of the skim milk cheese was comminuted in a curd mill and placed into a laydown cooker. 1.05 pounds of ultrafiltered skim milk retentate having 25% moisture and 2.01 pounds of water were also added to the laydown cooker. Agitation was commenced and heating was started by injecting steam into the mixture of the skim milk cheese and the ultrafiltered skim milk retentate. Heating and agitation was continued until a temperature of 160° F. was attained. After this temperature was reached, the steam was turned off and 0.075 pounds of sodium hexametaphosphate, 0.16 pounds of tapioca starch and 0.005 pounds of xanthan gum were added to the homogeneous mixture of skim milk cheese and non-fat dry milk. Steam injection was then used to heat the mixture to 190° F. under agitation conditions and agitation at the elevated temperature was continued for an additional 2 minutes to gelatinize the starch and permit interaction of the hexametaphosphate with the casein of the skim milk cheese and the non-fat dry milk. After aseptic processing at 275° F. for 25 seconds, the homogeneous blend of ingredients was then packaged into aseptic jars while at a temperature of 185° F. The steam added 0.475 pounds of water and the final moisture content of the cheese sauce was 80%. The cheese sauce product was placed into storage at a temperature of 72° F. and was periodically examined. The cheese sauce was still stable in terms of taste and texture after a period of 25 weeks.

What is claimed is:

1. A method for producing a high moisture, non-fat cheese sauce comprising
    (a) heating a mixture comprising skim milk cheese having from about 40% to about 60% moisture and a milk protein source having from about 3% to about 70% moisture to an elevated temperature of from about 160° F. to about 190° F. with agitation so as to form a homogeneous mixture of said cheese and said protein source;
    (b) continuing said agitation at said elevated temperature while adding a polyphosphate salt, starch and a gum to said heated mixture;
    (c) continuing said agitation at said elevated temperature for a period of time sufficient to gelatinize said starch and permit said polyphosphate salt to interact with the casein of said cheese and said protein source and form a stable, high moisture, non-fat cheese sauce having from about 70% to about 90% by weight of water; and
    (d) packaging said cheese sauce while the temperature of said cheese sauce is above about 100° F.

2. A method in accordance with claim 1 wherein said polyphosphate salt is selected from the group consisting of pyrophosphate, tripolyphosphate, long chain polyphosphates having from 4 to 13 phosphate moieties and cyclic phosphates.

3. A method in accordance with claim 2 wherein said polyphosphate is a sodium or potassium salt selected from the group consisting of pyrophosphate, tripolyphosphate, hexametaphosphate, glassy phosphate, Graham's salt, trimetaphosphate and tetrametaphosphate.

4. A method in accordance with claim 1 wherein said cheese sauce is packaged at a temperature above about 165° F. and is stored under refrigeration conditions.

5. A method in accordance with claim 1 wherein said cheese sauce is subjected to aseptic temperature treatment after step (c) to provide a cheese sauce product which is shelf-stable at ambient temperature conditions.

6. A method in accordance with claim 5 wherein said aseptic temperature conditions are a temperature of about 270° to about 275° F. for a time of about 22–28 seconds and equivalent time and temperature conditions.

7. A method in accordance with claim 1 wherein milk protein source is selected from the group consisting of baker's cheese, dry curd cottage cheese, non-fat milk solids, evaporated skim milk and skim milk retentate.

8. A method in accordance with claim 1 wherein said mixture comprises from about 10% to about 30% by weight of said skim milk cheese, from about 3% to about 9% by weight on a dry solids basis of said milk protein source, from about 0.2 to about 3.0% by weight of said polyphosphate salt, from about 1% to about 5% by weight of said starch and from about 0.02% to about 2.0% by weight of said gum.

9. A method in accordance with claim 1 wherein said starch is selected from the group consisting of natural and modified corn starch, tapioca starch, potato starch and rice starch.

10. A method in accordance with claim 1 wherein said gum is selected from the group consisting of gum karaya, gum tragacanth, carob bean gum, gelatin, sodium alginate, propylene glycol alginate, guar gum, sodium carboxymethyl cellulose, carrageenan, microcrystalline cellulose and xanthan gum.

11. A method in accordance with claim 10 wherein said gum is xanthan gum.

* * * * *